(12) United States Patent
Koseki et al.

(10) Patent No.: US 9,984,831 B2
(45) Date of Patent: May 29, 2018

(54) ELECTROLYTIC CAPACITOR HAVING A SOLID ELECTROLYTE LAYER AND MANUFACTURING METHOD THEREOF

(71) Applicant: NIPPON CHEMI-CON CORPORATION, Shinagawa-ku, Tokyo (JP)

(72) Inventors: Kazuya Koseki, Tokyo (JP); Masao Sakakura, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days. days.

(21) Appl. No.: 15/217,798

(22) Filed: Jul. 22, 2016

(65) Prior Publication Data

US 2016/0336117 A1 Nov. 17, 2016

Related U.S. Application Data

(63) Continuation of application No. PCT/JP2015/052395, filed on Jan. 28, 2015.

(30) Foreign Application Priority Data

Feb. 5, 2014 (JP) .................................. 2014-020718
Nov. 28, 2014 (JP) .................................. 2014-242367

(51) Int. Cl.
*H01G 9/15* (2006.01)
*H01G 9/028* (2006.01)
(Continued)

(52) U.S. Cl.
CPC ............. *H01G 9/15* (2013.01); *H01G 9/0036* (2013.01); *H01G 9/028* (2013.01); *H01G 9/032* (2013.01);
(Continued)

(58) Field of Classification Search
CPC .......... H01G 9/15; H01G 9/151; H01G 9/055; H01G 9/032; H01G 9/0036; H01G 9/035; H01G 9/028
See application file for complete search history.

(56) References Cited

U.S. PATENT DOCUMENTS 4,910,645 A 3/1990 Jonas et al.
6,307,735 B1 * 10/2001 Saito ...................... H01G 9/025
361/512
(Continued)

FOREIGN PATENT DOCUMENTS

CN 103403055 A 11/2013
CN 103430262 A 12/2013
(Continued)

OTHER PUBLICATIONS

Extended European search report for European Patent Application No. 15746932.1, dated Aug. 18, 2017.
(Continued)

*Primary Examiner* — David M Sinclair
(74) *Attorney, Agent, or Firm* — Shapiro, Gabor and Rosenberger, PLLC

(57) ABSTRACT

The present invention provides solid electrolytic capacitor with excellent properties in high-voltage application of 80V or more and a manufacturing method thereof. The solid electrolytic capacitor is manufactured by: forming, in a capacitor element with an anode electrode foil and a cathode electrode foil wound with an interposed separator, a solid electrolyte layer by using a conductive polymer dispersion in which particles of a conductive polymer dispersed in a solvent; and filling voids inside the capacitor element in which the solid electrolyte layer has been formed with an
(Continued)

electrolytic solution containing less than 9 wt % of a salt of a composite compound of inorganic acid and organic acid as a solute for filling.

7 Claims, 1 Drawing Sheet

(51) Int. Cl.
    *H01G 9/035*     (2006.01)
    *H01G 9/00*     (2006.01)
    *H01G 9/032*     (2006.01)
    *H01G 9/055*     (2006.01)

(52) U.S. Cl.
    CPC .............. *H01G 9/055* (2013.01); *H01G 9/151* (2013.01); *H01G 9/035* (2013.01)

(56) References Cited

U.S. PATENT DOCUMENTS

| | | | |
|---|---|---|---|
| 7,872,858 B2 | 1/2011 | Kakuma et al. | |
| 9,558,891 B2 | 1/2017 | Machida et al. | |
| 9,562,293 B2 | 2/2017 | Machida et al. | |
| 2004/0095708 A1* | 5/2004 | Takeda | H01G 9/035 361/504 |
| 2007/0121276 A1* | 5/2007 | Uzawa | H01G 9/035 361/503 |
| 2008/0002334 A1 | 1/2008 | Kakuma et al. | |
| 2008/0138704 A1* | 6/2008 | Mizuta | H01G 9/035 429/203 |
| 2008/0247119 A1* | 10/2008 | Kakuma | H01G 9/028 361/505 |
| 2008/0316679 A1* | 12/2008 | Sugihara | H01G 9/035 361/504 |
| 2009/0021893 A1 | 1/2009 | Kakuma et al. | |
| 2014/0016248 A1 | 1/2014 | Machida et al. | |
| 2014/0022701 A1 | 1/2014 | Machida et al. | |

FOREIGN PATENT DOCUMENTS

| | | |
|---|---|---|
| JP | 02-15611 A | 1/1990 |
| JP | 02-091917 A | 3/1990 |
| JP | 03-091225 A | 4/1991 |
| JP | 11-186110 A | 7/1999 |
| JP | 2004-134458 A | 4/2004 |
| JP | 2004-134655 A | 4/2004 |
| JP | 2009-016770 A | 1/2009 |

OTHER PUBLICATIONS

International Search Report from International Patent Application No. PCT/JP2015/052395, dated Apr. 7, 2015.

Office Action dated Jul. 31, 2017 in Chinese Patent Application No. 201580002788.2.

\* cited by examiner

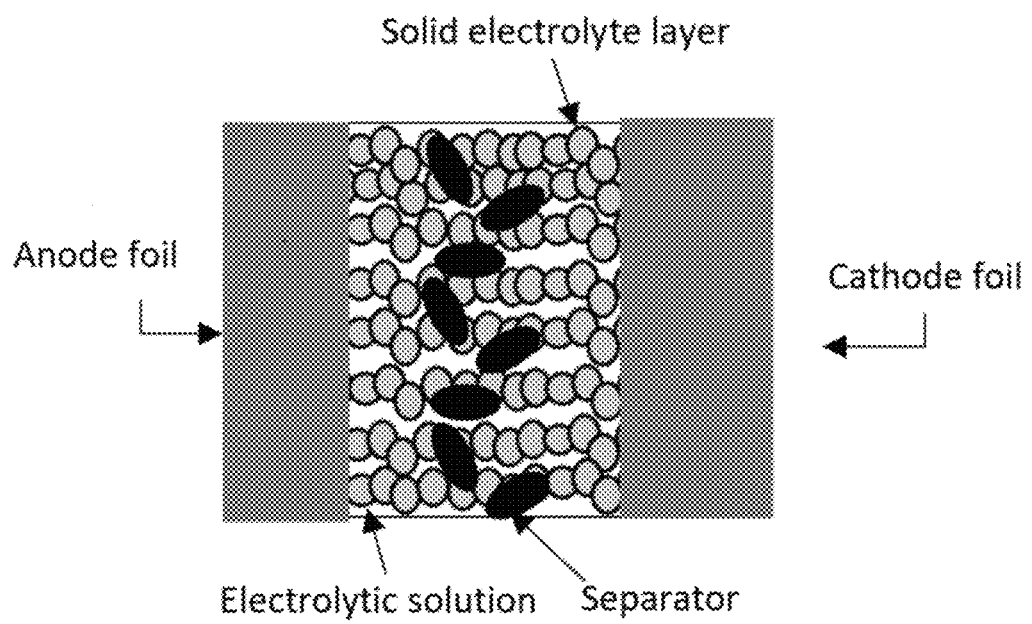

_US 9,984,831 B2_

ELECTROLYTIC CAPACITOR HAVING A SOLID ELECTROLYTE LAYER AND MANUFACTURING METHOD THEREOF

CROSS-REFERENCE TO RELATED APPLICATIONS

This application is a Continuation of PCT Application No. PCT/JP2015/052395, filed on Jan. 28, 2015, and claims priorities to Japanese Patent Application No. 2014-020718, filed on Feb. 5, 2014, Japanese Patent Application No. 2014-242367, filed on Nov. 28, 2014, the entire contents all which are incorporated herein by reference.

TECHNICAL FIELD

The present invention relates to a solid electrolytic capacitor and a manufacturing method thereof, in particular to a solid electrolytic capacitor suitable for high-voltage application of 80V or more and a manufacturing method thereof.

BACKGROUND ART

An electrolytic capacitor that utilizes a metal with valve action such as tantalum, aluminum, or the like is generally widely used, because compact size and large capacity can be obtained by making the valve action metal as an anode side counter electrode into a shape of a sintered body, etched foil, or the like to enlarge a surface of a dielectric. In particular, a solid electrolytic capacitor in which a solid electrolyte is used as an electrolyte has compact size, large capacity, and low equivalent series resistance, as well as characteristics such as good processability into a chip and suitability for surface mounting, so the solid electrolytic capacitor is essential for making an electronic instrument with more compact size, higher function, and lower cost.

For small-size and large-capacity application, this type of solid electrolytic capacitor generally has sealed structure manufactured through a step of forming a capacitor element by winding an anode foil and a cathode foil composed of the valve action metal such as aluminum with a separator being interposed, a step of impregnating the capacitor element with a driving electrolytic solution, and a step of accommodating the capacitor element in a case made of metal such as aluminum or a case made of synthetic resin. Aluminum as well as tantalum, niobium, titanium, and the like are used as an anode material, and the same type of metal as the anode material is used as a cathode material.

Furthermore, although manganese dioxide and a 7,7,8,8-tetracyanoquinodimethane (TCNQ) complex are known as a solid electrolyte used for the solid electrolytic capacitor, a technology focusing on a conductive polymer such as polyethylenedioxythiophene (hereinafter referred to as PEDOT) which has a low reaction rate and excellent adhesion with an oxide film layer of an anode electrode exists in recent years (see JP H2-15611 A).

A solid electrolytic capacitor of a type in which a solid electrolyte layer composed of the conductive polymer such as PEDOT is formed in such wound-type capacitor element is fabricated as follows. First, a surface of an anode foil made of a valve action metal such as aluminum is roughened by electrochemical etching treatment in an aqueous chloride solution to form numerous etching pits, and then a voltage is applied in an aqueous solution such as ammonium borate to form an oxide film layer which acts as a dielectric (chemical conversion). Similarly to the anode foil, a cathode foil is also made of a valve action metal such as aluminum, and etching treatment is applied on a surface thereof.

The anode foil with the oxide film layer thus formed on the surface and the cathode foil are wound with an interposed separator to form a capacitor element. Subsequently, after a repair chemical conversion to the capacitor element, the capacitor element is discharged with a polymerizable monomer such as 3,4-ethylenedioxythiophene (hereinafter referred to as EDOT) and an oxidizer solution respectively, or immersed in a mixed solution of the both, to promote a polymerization reaction inside the capacitor element and generate a solid electrolyte layer composed of a conductive polymer such as PEDOT. After that, the capacitor element is accommodated in an exterior case with a closed-end cylindrical shape to fabricate a solid electrolytic capacitor.

Furthermore, the conductive polymer containing polypyrrole or polyaniline and an electrolytic solution containing γ-butyrolactone or ethylene glycol have been used in combination to reduce leakage current and improve ESR by action of the electrolytic solution to repair a defective part of a chemical conversion coating (see JP 11-186110 A).

SUMMARY OF INVENTION

Technical Problem

Meanwhile, in recent years, a solid electrolytic capacitor with good ESR properties at high temperature which can be used not only in low-voltage application of approximately 25V or 63V in vehicle and for a general power supply circuit but also in high-voltage application of 80V or more has been demanded.

The present invention was proposed to solve the problem as described above, and the object is to provide a solid electrolytic capacitor with excellent properties in high-voltage application of 80V or more and a manufacturing method thereof.

Solution to Problem

As a result of various examinations to solve the problem as described above, the inventors have found that, when a borodisalicylic acid salt is used as a solute of an electrolytic solution for filling a capacitor element and concentration of the salt is a predetermined amount or less, ESR properties at high temperature in a high-voltage range are improved, so, based on the finding, the present invention has been completed.

Namely, the solid electrolytic capacitor according to the present invention is manufactured by: forming, in a capacitor element with an anode electrode foil and a cathode electrode foil wound with an interposed separator, a solid electrolyte layer by using a conductive polymer dispersion in which particles of a conductive polymer is dispersed in a solvent; and filling voids inside the capacitor element in which the solid electrolyte layer has been formed with an electrolytic solution containing less than 9 wt % of a salt of a composite compound of inorganic acid and organic acid as a solute.

Furthermore, a method for manufacturing the solid electrolytic capacitor as described above is also one of the present inventions.

Advantageous Effects of Invention

According to the present invention, a solid electrolytic capacitor with excellent properties in high-voltage application of 80V or more and a manufacturing method thereof can be provided.

BRIEF DESCRIPTION OF THE DRAWING

The sole drawing is a schematic representation of the structure of an electrolytic capacitor according to the invention.

DESCRIPTION OF EMBODIMENTS

Hereinafter, the present invention will be described in detail by disclosing a representative procedure for manufacturing a solid electrolytic capacitor according to the present invention.

(Method for Manufacturing Solid Electrolytic Capacitor)

An example of the method for manufacturing a solid electrolytic capacitor according to the present invention is as follows. Namely, an anode foil with an oxide film layer formed on the surface and a cathode foil are wound with an interposed separator to form a capacitor element, and then a repair chemical conversion is applied to the capacitor element (first step). The capacitor element is then impregnated with a conductive polymer dispersion in which particles of a conductive polymer are dispersed in a solvent, to form a solid electrolyte layer (second step). Subsequently, the capacitor element in which the solid electrolyte layer has been formed is immersed in a predetermined electrolytic solution to fill voids inside the capacitor element with the electrolytic solution (third step). Finally after inserting the capacitor element into an exterior case, sealing rubber is attached to an opening end to seal by caulking, and then aging is applied, to form a solid electrolytic capacitor (fourth step).

(Electrode Foil)

The anode foil is made of a valve action metal such as aluminum and the like and rough-surfaced by etching treatment to form numerous etching pits. Furthermore, a voltage is applied to a surface of the anode foil in an aqueous solution such as ammonium borate to form an oxide film layer which acts as a dielectric. Similarly to the anode foil, the cathode foil is made of aluminum or the like, and etching treatment is applied on a surface thereof. A foil to which a chemical conversion is applied, a foil in which layers composed of a metal nitride, a metal carbide, and a metal carbonitride are formed by a deposition method, or a foil which contains carbon in the surface may be also used as necessary.

(Separator)

As the separator, a separator made of a synthetic fiber-based nonwoven fabric and a separator made of glass fiber can be used. For the synthetic fiber, polyester fiber, nylon fiber, rayon fiber, or the like is suitable. Furthermore, a separator made of natural fiber may be used.

(Chemical Conversion Solution for Repair Chemical Conversion in First Step)

As a chemical conversion solution for the repair chemical conversion, a phosphoric acid-based chemical conversion solution such as ammonium dihydrogen phosphate and diammonium hydrogen phosphate, a boric acid-based chemical conversion solution such as ammonium borate, and an adipic acid-based chemical conversion solution such as adipic acid ammonium can be used, among which ammonium dihydrogen phosphate is preferably used. Furthermore, immersion time is preferably 5 to 120 minutes.

(Conductive Polymer Dispersion in Second Step)

For the conductive polymer dispersion, a mixture of PEDOT powder and a solid content of a dopant composed of polystyrene sulfonate is preferable. The solvent for the conductive polymer dispersion may be a liquid which can dissolve the conductive polymer particles or powder, and water is mainly used. However, as necessary, ethylene glycol may be individually or mixedly used as the solvent for the dispersion. It has been revealed that, among electrical properties of a product, ESR can be particularly reduced when ethylene glycol is used as the solvent for the dispersion.

Furthermore, in order to improve impregnating ability and electric conductivity of the conductive polymer dispersion, various additives may be added to the conductive polymer dispersion, or neutralization may be performed by adding a cation. Particularly, when sorbitol, or sorbitol and polyalcohol are used as the additive, ESR can be reduced and deterioration of withstand voltage characteristics caused by lead-free reflow or the like can be prevented.

(Impregnation with Conductive Polymer Dispersion)

Time for impregnating the capacitor element with the conductive polymer dispersion is determined according to a size of the capacitor element. It is preferably 5 seconds or more for a capacitor element with approximately 5 mm diameter×3 mm length and 10 seconds or more for a capacitor element with approximately 9 mm diameter×5 mm length, and impregnation for at least 5 seconds is required. There is no adverse effect on properties even if the capacitor element is impregnated for a long time. Furthermore, the capacitor element is suitably maintained in reduced pressure condition after such impregnation. This is probably because a residual amount of a volatile solvent is reduced by the maintenance. The impregnation and drying of the conductive polymer dispersion may be performed several times as necessary.

(Electrolytic Solution in Third step)

As a solvent for the electrolyte solution, a solvent with a boiling point of 120° C., which is a life test temperature, or more is preferably used. Examples of the solvent include γ-butyrolactone, polyalcohol such as ethylene glycol, sulfolane, dimethylformamide, and the like. As the polyalcohol, low molecular weight polyalcohol such as ethylene glycol, diethylene glycol, dipropylene glycol, 1,2-propanediol, glycerine, 1,3-propanediol, 1,3-butanediol, and 2-methyl-2,4-pentanediol is preferable. Particularly, when a mixed solvent composed of low molecular weight polyalcohol such as ethylene glycol and γ-butyrolactone is used, initial ESR characteristics as well as high temperature characteristics are improved.

Namely, it has been revealed that when the mixed solvent composed of ethylene glycol and γ-butyrolactone is used, initial ESR is reduced and a rate of change in electrostatic capacitance (ΔCap) is small in long time use, compared to when a solvent which does not contain ethylene glycol is used. This is probably because, since ethylene glycol has an effect of promoting extension of a polymer chain of a conductive polymer, electric conductivity is improved and ESR is reduced. Furthermore, this is probably because, since a protic solvent with a hydroxyl group such as ethylene glycol has higher affinity with the separator and the electrode foil, and the conductive polymer, compared to γ-butyrolactone and sulfolane, delivery of charge between the separator and the electrode foil, and the conductive polymer, and the electrolyte solution is easily performed in a process of electrolyte solution evaporation during the use of the electrolytic capacitor, so ΔCap becomes small. The amount of ethylene glycol added to the mixed solvent is preferably 5 wt % or more, more preferably 40 wt % or more, most preferably 60 wt % or more.

Furthermore, impregnating ability of the electrolyte solution to the capacitor element can be improved by adding a predetermined amount of γ-butyrolactone as the solvent for the electrolyte solution. By using ethylene glycol with relatively high viscosity and γ-butyrolactone with low viscosity, the impregnating ability to the capacitor element is increased, initial properties and good properties in long time use are maintained, and charge and discharge property at low temperature is improved. The amount of γ-butyrolactone added to the mixed solvent is preferably 40 wt % or less.

Furthermore, at least one type of solvent selected from sulfolane, 3-methylsulfolane, and 2,4-dimethylsulfolane may be additively used with the mixed solvent composed of ethylene glycol and γ-butyrolactone as ion conductive substances. Since the sulfolane-based solvents have a high boiling point, the evaporation of the electrolyte solution is suppressed and the high temperature characteristics are improved. The amount of the sulfolane-based solvents added to the mixed solvent is preferably 40 wt % or less.

As a solute for the electrolytic solution, a salt of a composite compound of organic acid and inorganic acid is used. The salt can include at least one type of ammonium salt, quaternary ammonium salt, quaternized amidinium salt, amine salt, and the like. The organic acid includes: carboxylic acid such as phthalic acid, isophthalic acid, terephthalic acid, maleic acid, adipic acid, benzoic acid, toluic acid, enanthic acid, malonic acid, 1,6-decanedicarboxylic acid, 1,7-octane dicarboxylic acid, azelaic acid, salicylic acid, oxalic acid, and glycolic acid; and phenols. The inorganic acid includes boric acid, phosphoric acid, phosphorous acid, hypophosphorous acid, phosphate ester, carbonic acid, silicic acid, and the like. The composite compound of organic acid and inorganic acid includes borodisalicylic acid, borodioxalic acid, borodiglycollic acid, and the like.

Furthermore, at least one type of the salt of the composite compound of organic acid and inorganic acid includes ammonium salt, quaternary ammonium salt, quaternized amidinium salt, amine salt, and the like. A quaternary ammonium ion of the quaternary ammonium salt includes tetramethylammonium, triethylmethylammonium, tetraethylammonium, and the like. Quaternized amidinium includes ethyldimethylimidazolinium, tetramethylimidazolinium, and the like. Amine of the amine salt includes primary amine, secondary amine, and tertiary amine. The primary amine includes methylamine, ethylamine, propylamine, and the like, the secondary amine includes dimethylamine, diethylamine, ethylmethylamine, dibutylamine, and the like, and the tertiary amine includes trimethylamine, triethylamine, tributylamine, ethyldiisopropylamine, and the like.

In the electrolytic solution above, as apparent from Examples described below, the amount of a solute composed of the salt of the composite compound of organic acid and inorganic acid, particularly a borodisalicylic acid salt, added to the electrolytic solution is less than 9 wt %, preferably 7 wt % or less, most preferably less than 5 wt %. According to a result of evaluating various salts, this is probably because the salt of the composite compound can improve chemical convertibility as the electrolytic solution, as well as have high affinity with the conductive polymer and hardly deteriorate a conductive polymer layer in a high temperature durability test, and, more specifically, because the deterioration of the conductive polymer layer is suppressed as concentration of the solute is lower.

Furthermore, an additive for the electrolytic solution includes polyoxyethylene glycol, a complex compound of boric acid and polysaccharides (such as mannite and sorbit), a complex compound of boric acid and polyalcohol, a nitro compound (such as o-nitrobenzoic acid, m-nitrobenzoic acid, p-nitrobenzoic acid, o-nitrophenol, m-nitrophenol, and p-nitrophenol), phosphate ester, and the like.

(Filling Condition of Electrolytic Solution)

When the electrolytic solution as described above is filled in the capacitor element, a filling amount is arbitrary as long as the electrolytic solution can be filled in the voids inside the capacitor element, but 3 to 100% of the voids inside the capacitor element is preferable.

(Action, Effect)

As described above, ESR properties at high temperature are improved by impregnating the capacitor element with the predetermined electrolytic solution and filling the voids inside the capacitor element with the electrolytic solution after the conductive polymer has been formed in the capacitor element.

This is because, since a conventional polymerization reaction residue itself is not present in the capacitor element fabricated as described above, reduction of withstand voltage below one of the conductive polymer due to the reaction residue can be suppressed, so the withstand voltage can be improved. Furthermore, in such high-voltage application, by using the predetermined amount of the predetermined composite compound of organic acid and inorganic acid as described above, the chemical convertibility as the electrolytic solution is improved, as well as the affinity with the conductive polymer becomes higher and the deterioration of the conductive polymer layer in the high temperature durability test is suppressed, so the ESR properties at high temperature are probably improved.

EXAMPLES

Hereinafter, the present invention will be described in more detail based on Examples and Comparative Examples manufactured as follows.

First, as shown in Table 1, electrolytic solutions with various compounding ratios between ethylene glycol and ammonium borodisalicylate were prepared (Examples 1 to 4, Comparative Example 1), and then, for Reference Example 1, an electrolytic solution with a compounding ratio between ethylene glycol and triethylamine phthalate of 99:1 was prepared. Subsequently, withstand voltage of the electrolytic solutions was evaluated.

TABLE 1

|  | Electrolyte Solution | wt % | Withstand Voltage |
|---|---|---|---|
| Example 1 | Ethylene glycol | 99 | 281 V |
|  | Ammonium borodisalicylate | 1 |  |
| Example 2 | Ethylene glycol | 97 | 272 V |
|  | Ammonium borodisalicylate | 3 |  |
| Example 3 | Ethylene glycol | 95 | 251 V |
|  | Ammonium borodisalicylate | 5 |  |
| Example 4 | Ethylene glycol | 93 | 220 V |
|  | Ammonium borodisalicylate | 7 |  |
| Comparative Example 1 | Ethylene glycol | 91 | 171 V |
|  | Ammonium borodisalicylate | 9 |  |
| Reference Example 1 | Ethylene glycol | 99 | 100 V |
|  | Triethylamine phthalate | 1 |  |

Measurement results of the withstand voltage obtained by impregnating a mensurative capacitor element with the electrolytic solutions prepared in Examples 1 to 4, Comparative Example 1, and Reference Example 1 are also shown in Table 1. In a measurement method, the capacitor element obtained by winding an anode foil with an oxide film and a cathode foil with an interposed separator is impregnated with the electrolytic solutions prepared in Examples 1 to 4, Comparative Example 1, and Reference Example 1 without forming a conductive polymer layer to measure breakdown voltage under room temperature with current density of 10 mA.

As apparent from the results in Table 1, although the withstand voltage in 9 wt % of ammonium borodisalicylate is 171V (Comparative Example 1), the withstand voltage in 7 wt % is 220V (Example 4), in 5 wt %, 251V (Example 3), in 3 wt %, 272V (Example 2), and in 1 wt %, 281V (Example 1), so the withstand voltage is improved as the amount of ammonium borodisalicylate as a solute is decreased. Furthermore, comparing Example 1 and Reference Example 1, although the amount of the solute is the same, the withstand voltage is improved nearly 3 times.

Thus, it is found that, when the amount of ammonium borodisalicylate is less than 9 wt %, particularly 7 wt % or less, the withstand voltage is remarkably improved.

Subsequently, as shown in Table 2, for electrolytic solutions with various compounding ratios between ethylene glycol and trimethylamine borodisalicylate (Examples 5 to 8, Comparative Example 2), withstand voltage was measured by the same method as described above. Results are shown in Table 2.

TABLE 2

| | Electrolyte Solution | wt % | Withstand Voltage |
|---|---|---|---|
| Example 5 | Ethylene glycol | 99 | 280 V |
| | Trimethylamine borodisalicylate | 1 | |
| Example 6 | Ethylene glycol | 97 | 270 V |
| | Trimethylamine borodisalicylate | 3 | |
| Example 7 | Ethylene glycol | 95 | 250 V |
| | Trimethylamine borodisalicylate | 5 | |
| Example 8 | Ethylene glycol | 93 | 220 V |
| | Trimethylamine borodisalicylate | 7 | |
| Comparative Example 2 | Ethylene glycol | 91 | 170 V |
| | Trimethylamine borodisalicylate | 9 | |
| Reference Example 1 | Ethylene glycol | 99 | 100 V |
| | Triethylamine phthalate | 1 | |

As apparent from the results in Table 2, although the withstand voltage in 9 wt % of trimethylamine borodisalicylate is 170V (Comparative Example 2), the withstand voltage in 7 wt % is 220V (Example 8), in 5 wt %, 250V (Example 7), in 3 wt %, 270V (Example 6), and in 1 wt %, 280V (Example 5), so the withstand voltage is improved as the amount of trimethylamine borodisalicylate as the solute is decreased. Furthermore, comparing Example 5 and Reference Example 1, although the amount of the solute is the same, the withstand voltage is improved nearly 3 times.

Thus, it is found that, when the amount of trimethylamine borodisalicylate is less than 9 wt %, particularly 7 wt % or less, the withstand voltage is remarkably improved.

After that, a solid electrolytic capacitor with the conductive polymer layer and the electrolytic solution was evaluated while varying a type of a solvent and the solute for the electrolytic solution. Solid electrolytic capacitors in Examples 9 to 18 and Reference Example 2 were fabricated as follows. First, an electrode leading means was connected to an anode foil with an oxide film layer formed on the surface and a cathode foil, and then the both electrode foils were wound with an interposed separator to form a capacitor element with an element shape of 10 mm diameter×12.5 mm length. Subsequently, the capacitor element was immersed in an aqueous ammonium dihydrogen phosphate solution for 40 minutes to perform a repair chemical conversion. After that, the capacitor element was immersed in a conductive polymer dispersion in which fine particles of PEDOT and polystyrene sulfonate were dispersed in an aqueous solution containing 5 wt % of ethylene glycol, and then the capacitor element was pulled out and dried at approximately 150° C. Furthermore, the immersion in the conductive polymer dispersion/the drying of the capacitor element was repeated several times to form a conductive polymer layer composed of a conductive polymer in the capacitor element. Next, the capacitor element was filled with various types of an electrolytic solution with various compounding ratios of the solvent as shown in Table 3 (Examples 9 to 18 and Reference Example 2). The compounding ratios for the electrolytic solution in Table 3 are shown by pts·wt. Then, the capacitor element was inserted into an exterior case with a closed-end cylindrical shape, and sealing rubber was attached to an opening end to seal by caulking. Finally, aging was applied by voltage application to form the solid electrolytic capacitor. A rated voltage of the solid electrolytic capacitor is 100 WV, and rated capacity is 33 μF.

Initial ESR properties as well as results of ESR properties and ΔCap when a no-load storage test at 125° C. for 1500 hours was performed on the solid electrolytic capacitors are shown in Table 3. In this specification, all the ESR properties are indicated by values at 100 kHz (20° C.).

TABLE 3

| | Electrolyte Solution | | Initial ESR [mΩ] | 125° C., 1500 h ESR [mΩ] | No-load storage ΔCap [%] |
|---|---|---|---|---|---|
| Example 9 | Ethylene glycol | 100 | 21 | 28 | −4.5 |
| | Ammonium borodisalicylate | 1 | | | |
| Example 10 | Ethylene glycol | 90 | 23 | 30 | −4.7 |
| | γ-butyrolactone | 5 | | | |
| | Sulfolane | 5 | | | |
| | Ammonium borodisalicylate | 1 | | | |
| Example 11 | Ethylene glycol | 80 | 25 | 32 | −5.1 |
| | γ-butyrolactone | 20 | | | |
| | Ammonium borodisalicylate | 1 | | | |
| Example 12 | Ethylene glycol | 60 | 26 | 36 | −5.3 |
| | γ-butyrolactone | 40 | | | |
| | Ammonium borodisalicylate | 1 | | | |

TABLE 3-continued

|  | Electrolyte Solution |  | Initial ESR [mΩ] | 125° C., 1500 h ESR [mΩ] | No-load storage ΔCap [%] |
|---|---|---|---|---|---|
| Example 13 | Ethylene glycol | 40 | 27 | 47 | −5.7 |
|  | γ-butyrolactone | 40 |  |  |  |
|  | Sulfolane | 20 |  |  |  |
|  | Ammonium borodisalicylate | 1 |  |  |  |
| Example 14 | Ethylene glycol | 20 | 30 | 55 | −5.8 |
|  | γ-butyrolactone | 40 |  |  |  |
|  | Sulfolane | 40 |  |  |  |
|  | Ammonium borodisalicylate | 1 |  |  |  |
| Example 15 | Ethylene glycol | 5 | 31 | 65 | −10.3 |
|  | γ-butyrolactone | 90 |  |  |  |
|  | Sulfolane | 5 |  |  |  |
|  | Ammonium borodisalicylate | 1 |  |  |  |
| Example 16 | Ethylene glycol | 90 | 25 | 34 | −4.9 |
|  | γ-butyrolactone | 5 |  |  |  |
|  | Sulfolane | 5 |  |  |  |
|  | Trimethylamine borodisalicylate | 1 |  |  |  |
| Example 17 | Ethylene glycol | 90 | 26 | 52 | −5.0 |
|  | γ-butyrolactonee | 5 |  |  |  |
|  | Sulfolane | 5 |  |  |  |
|  | Trimethylamine borodisalicylate | 1 |  |  |  |
| Example 18 | Ethylene glycol | 70 | 30 | 39 | −4.2 |
|  | γ-butyrolactone | 5 |  |  |  |
|  | Sulfolane | 5 |  |  |  |
|  | Polyoxyethylene glycol | 20 |  |  |  |
|  | Ammonium borodisalicylate | 1 |  |  |  |
| Reference Example 2 | Ethylene glycol | 100 | 25 | 80 | −5.0 |
|  | Triethylamine phthalate | 1 |  |  |  |

From the results in Table 3, it is found that, as shown in Example 9, when a content of ethylene glycol as the solvent for the electrolytic solution is 100%, the initial ESR and deterioration of the property after a high temperature test are minimized in comparison with the other Examples. On the other hand, as shown in Reference Example 2, even if the content of ethylene glycol as the solvent for the electrolytic solution is 100% when triethylamine phthalate is used as the solute for the electrolytic solution, the initial ESR is slightly increased. Furthermore, it is found that, compared to Example 9, deterioration of the property after the test is large, particularly the ESR is deteriorated nearly 3 times.

Comparing Example 10 and Example 16, it is found that, when ammonium borodisalicylate is used as shown in Example 10, the initial ESR is low and deterioration of the property after the high temperature test is small compared to the case where trimethylamine borodisalicylate is used as shown in Example 16.

Comparing Example 16 and Example 17, it is found that, when trimethylamine borodisalicylate is used as shown in Example 16, the initial ESR is low and deterioration of the property after the high temperature test is small compared to the case where borodisalicylic acid triethylamine is used as shown in Example 17. In results of a separately performed withstand voltage test, properties were equal between Example 16 and Example 17.

Furthermore, comparing Example 10 and Example 18, when polyoxyethylene glycol is used as the solvent in addition to ethylene glycol as shown in Example 18, ΔCap after the high temperature test is improved compared to the case where polyoxyethylene glycol is not used as the solvent as shown in Example 10. Thus, polyoxyethylene glycol probably has an effect of improving ΔCap after the high temperature test.

Finally, a solid electrolytic capacitor with the conductive polymer layer and the electrolytic solution was evaluated while varying a type of the solvent and the solute for the electrolytic solution. Solid electrolytic capacitors in Examples 19 to 21 and Comparative Example 3 were fabricated as follows.

First, an electrode leading means was connected to an anode foil with an oxide film layer formed on the surface and a cathode foil, and then the both electrode foils were wound with an interposed separator to form a capacitor element with an element shape of 10 mm diameter×12.5 mm length. Subsequently, the capacitor element was immersed in an aqueous ammonium dihydrogen phosphate solution for 40 minutes to perform a repair chemical conversion. After that, the capacitor element was immersed in a conductive polymer dispersion in which fine particles of PEDOT and polystyrene sulfonate were dispersed in an aqueous solution containing 5 wt % of ethylene glycol, and then the capacitor element was pulled out and dried at approximately 150° C. Furthermore, the immersion in the conductive polymer dispersion/the drying of the capacitor element was repeated several times to form a conductive polymer layer composed of a conductive polymer in the capacitor element. Next, the capacitor element was filled with an electrolytic solution with various compounding ratios between ethylene glycol and ammonium borodisalicylate as shown in Table 4 (Examples 19 to 21 and Comparative Example 3). To each electrolytic solution, phosphate ester and nitro compound were added as an additive. Total amount of phosphate ester and nitro compound as the additive added to the electrolytic solution was prepared to 2.5 wt %. Then, the capacitor element was inserted into an exterior case with a closed-end cylindrical shape, and sealing rubber was attached to an opening end to seal by caulking. Finally, aging was applied by voltage application to form the solid electrolytic capacitor. A rated voltage of the solid electrolytic capacitor is 100 WV, and rated capacity is 33 μF.

Initial ESR properties as well as results of ESR properties when a no-load storage test at 150° C. for 1000 hours was performed on the solid electrolytic capacitors are shown in Table 4.

TABLE 4

| Electrolyte Solution | | wt % | ESR [mΩ] Initial | ESR [mΩ] After the Test |
|---|---|---|---|---|
| Example 19 | Ethylene glycol | 99 | 21 | 35 |
|  | Ammonium borodisalicylate | 1 | | |
| Example 20 | Ethylene glycol | 95 | 21 | 84 |
|  | Ammonium borodisalicylate | 5 | | |
| Example 21 | Ethylene glycol | 93 | 22 | 293 |
|  | Ammonium borodisalicylate | 7 | | |
| Comparative Example 3 | Ethylene glycol | 91 | 22 | 513 |
|  | Ammonium borodisalicylate | 9 | | |

As apparent from the results in Table 4, although the ESR after the test in 9 wt % of ammonium borodisalicylate is 513 mΩ (Comparative Example 3), the ESR after the test in 7 wt % is 293 mΩ (Example 21), in 5 wt %, 84 mΩ (Example 20), and in 1 wt %, 35 mΩ (Example 19). Namely, it is found that, as the amount of ammonium borodisalicylate as the solute is decreased, the ESR after the test is reduced and thus deterioration of the property after the shelf test is small. Consequently, it is found that, when the amount of borodisalicylic acid triethylamine is less than 9 wt %, particularly 7 wt % or less, the ESR is largely reduced. For reference, even if the element with the same specifications is used, initial ESR of the electrolytic capacitor with only the electrolytic solution as an electrolyte is approximately 470 mΩ. It is found that, in the hybrid capacitor according to the present invention, the initial ESR as well as the ESR after the shelf test are 470 mΩ or less, so electrical properties are superior.

The invention claimed is:

1. A solid electrolytic capacitor, comprising:
   a capacitor element with an anode electrode foil and a cathode electrode foil wound with an interposed separator,
   a solid electrolyte layer formed in the capacitor element by using a conductive polymer dispersion in which particles of a conductive polymer are dispersed in a solvent; and
   voids inside the capacitor element in which the solid electrolyte layer has been formed filled with an electrolytic solution containing less than 9 wt % of an ammonium salt of a composite compound of inorganic acid and organic acid as a solute and containing 20 wt % or more ethylene glycol with respect to a solvent in the electrolytic solution.

2. The solid electrolytic capacitor according to claim 1, wherein polyoxyethylene glycol is additionally incorporated in the solvent of the electrolytic solution.

3. The solid electrolytic capacitor according to claim 1, wherein the composite compound of inorganic acid and organic acid is borodisalicylic acid, borodiglycolic acid, or borodioxalic acid.

4. The solid electrolytic capacitor according to claim 1, wherein the solid electrolytic capacitor is used for high-voltage application of 80V or more.

5. The solid electrolytic capacitor according to claim 1, wherein polyoxyethylene glycol is additionally incorporated in the solvent of the electrolytic solution, wherein the composite compound of inorganic acid and organic acid is borodisalicylic acid, borodiglycolic acid, or borodioxalic acid.

6. The solid electrolytic capacitor according to claim 1, wherein polyoxyethylene glycol is additionally incorporated in the solvent of the electrolytic solution, wherein the solid electrolytic capacitor is used for high-voltage application of 80V or more.

7. A method for manufacturing a solid electrolytic capacitor, comprising:
   forming a solid electrolyte layer by impregnating a capacitor element with a conductive polymer dispersion in which particles of a conductive polymer are dispersed in a solvent, the capacitor element is wound with an anode electrode foil and a cathode electrode foil with an interposed separator; and
   impregnating voids inside the capacitor element in which the solid electrolyte layer has been formed with an electrolytic solution containing less than 9 wt % of an ammonium salt of a composite compound of inorganic acid and organic acid as a solute and containing 20 wt % or more ethylene glycol with respect to a solvent in the electrolytic solution.

* * * * *